United States Patent [19]

Zaopo

[11] Patent Number: 4,726,993

[45] Date of Patent: Feb. 23, 1988

[54] ELECTRIC CABLE WITH COMBINED RADIATION CROSS-LINKED AND NON-CROSS-LINKED INSULATION

[75] Inventor: Antonio Zaopo, Milan, Italy

[73] Assignee: Societa' Cavi Pirelli S.p.A., Milan, Italy

[21] Appl. No.: 803,725

[22] Filed: Dec. 2, 1985

[30] Foreign Application Priority Data

Dec. 6, 1984 [IT] Italy .............................. 23928 A/84

[51] Int. Cl.[4] ........................ B32B 15/00; D02G 3/00

[52] U.S. Cl. ...................................... 428/379; 428/35; 428/375; 428/377; 428/378; 174/110 R; 174/110 SR; 174/110 N

[58] Field of Search ................. 428/377, 378, 32, 379; 174/110 R, 110 SR, 110 N

[56] References Cited

U.S. PATENT DOCUMENTS 3,930,104 12/1975 MacKenzie, Jr. et al. .... 174/110 SR
4,121,001 10/1978 Gotcher et al. ..................... 428/379
4,268,659 5/1981 Bederke et al. .............. 174/110 SR
4,317,858 3/1982 Sattler ................................ 428/379
4,330,493 5/1982 Miyamoto et al. ................. 428/379
4,348,459 9/1982 Dezal et al. .......................... 428/379
4,448,844 5/1984 Osada et al. .................. 174/110 SR
4,471,021 9/1984 Pauze et al. ................... 174/110 SR
4,521,485 6/1985 Tondre et al. ....................... 428/379

FOREIGN PATENT DOCUMENTS 4268 2/1975 Japan ........................... 174/110 SR

*Primary Examiner*—Ellis P. Robinson
*Assistant Examiner*—S. A. Gibson
*Attorney, Agent, or Firm*—Brooks Haidt Haffner & Delahunty

[57] ABSTRACT

A low-voltage cable with insulation having good fire self-extinguishing and life cycle properties and with improved heat resisting and low toxic gas generation properties. The cable is formed by extruding a mixture of a polymer which is substantially non-cross-linkable by irradiation, a monomer cross-linkable by irradiation and optionally, a fluidizing polymeric material which is cross-linkable by irradiation around a conductor and subjecting the so-formed cable to irradiation to cross-link the materials cross-linkable by irradiation.

5 Claims, 1 Drawing Figure

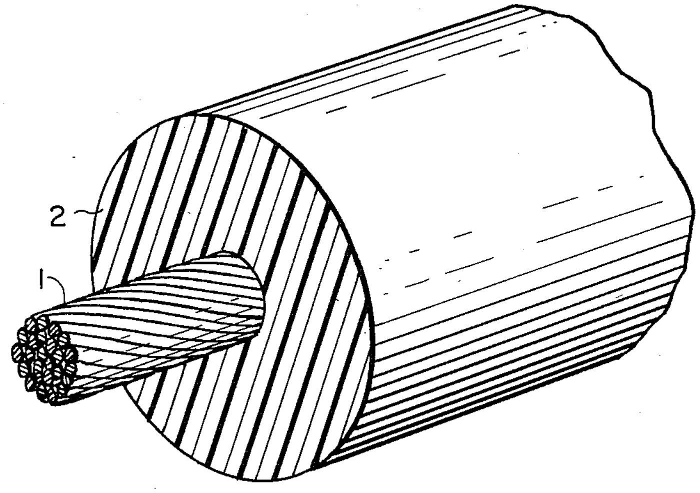
2
1

ELECTRIC CABLE WITH COMBINED RADIATION CROSS-LINKED AND NON-CROSS-LINKED INSULATION

The present invention relates to heat-resistant and fire non-propagating, low-voltage cables of the type commonly referred to as "building wires" and which are used in civil and military installations.

The known heat-resistant and fire non-propagating cables usually include a conductor covered by a compound based upon cross-linked polymeric materials.

Among the already known heat-resistant and fire non-propagating cables, those which present better characteristics, with respect to such properties, are those that have the conductor covering made from a compound based upon fluorinated-polymers, such as, ethylene tetrafluoroethylene copolymer and ethylene chlorotrifluoroethylene copolymer which, in addition to such properties, allow the conductor insulation to have a reduced thickness. However, the drawback of these known cables is that they emit toxic smoke during fires because of the fact that, when the insulating coverings burn, they generate gases containing fluorine and chlorine, and/or their mixtures.

One object of this invention is to provide low-voltage, fire non-propagating electric cables which have an improved heat-resistance with respect to the known cables of the same type, which do not generate toxic gases during fires and which also have a conductor covering of a smaller thickness as compared to the conductor coverings obtained with the use of the copolymers set forth hereinbefore.

The low voltage electric cable of the present invention comprises at least one conductor and at least one insulating covering layer for the conductor which is the result of irradiating a mixture of at least two polymeric materials, one of which is readily cross-linked through irradiation and the other of which is substantially not cross-linkable by irradiation, the latter polymeric materials being at least one of the polyarylates, aromatic polyethersulfones, aromatic polysulfones, aromatic polysulfides, aromatic polyetherimides, aromatic polyimides, aromatic polyamides and aromatic polyimideamides, the material which is readily cross-linked by irradiation is a monomer polymerizable by irradiation being at least one of triallycyanurate, triallyisocyanurate, trimethylolpropane trimethacrylate and ethoxylated bis-phenol-A-trimethacrylate.

Other objects and advantages of the present invention will be apparent from the following detailed description of the presently preferred embodiments thereof, which description should be considered in conjunction with the single FIGURE of the accompanying drawing which is a fragmentary perspective view of a cable of the invention with a portion of the insulation removed. .

In the drawing, the cable includes a conductor 1 formed either by a single wire, for example, of copper or aluminum, or by a plurality of wires made of copper or aluminum layed-up together. The conductor 1 has an insulating covering 2 which is the result of irradiating a mixture of the polymeric materials described hereinbefore and which has the characteristics described hereinafter.

In the embodiment shown in the drawing, the conductor covering 2 is formed of a single layer, but the conductor covering 2 can be formed by a plurality of superimposed similar layers.

The fundamental characteristic of a mixture for forming the conductor-covering 2, according to the invention, is that it includes at least two basic components prior to subjecting the mixture to irradiation.

The first of these two essential components of the mixture is a polymeric material, called the "base polymer" herein, which is substantially not cross-linkable by the irradiation to which the mixture is subjected and which is one or more of the polyarylates, aromatic polyether sulfones, aromatic polysulfones, aromatic polysulfides, aromatic polyetherimides, aromatic polyimides, aromatic polyamides and aromatic polyimide-amides.

Since all the above-listed polymers are predominantly aromatic in nature, they are substantially not cross-linkable through irradiation when they are subjected to the normally used amounts of radiation-energy used for cross-linking.

The second essential component present in the mixture, prior to the cross-linking, is a monomer polymerizable by irradiation and which is one or more of triallylcyanurate, triallylisocyanurate, trimethylol-propane-trimethacrylate and ethoxylated bis-phenol-A-trimethacrylate.

Prior to the cross-linking of the second component by irradiation, one of these monomers is present in the mixture in an amount in the range from about at least 5 to about 100 parts by weight with respect to 100 parts by weight of the base polymer and preferably, is present in an amount in the range from about 10 to about 30 parts by weight with respect to 100 parts by weight of the base polymer.

A mixture containing the essential components, which is an extrudable compound, is extruded in a conventional way, over the conductor 1 in such a manner as to form a covering over it, and thereafter, it is subjected to cross-linking irradiation by passing the so-covered conductor through a device, of the per se known type, conventionally used for irradiation cross-linking.

Due to the irradiation, the monomer present in the covering which is a poly-functional unsaturated monomer, undergoes polymerization. Since the monomer in the covering is uniformly distributed and also polyfunctional, it forms a tridimensional polymeric net (when it is polymerized) which encloses in its meshes the base polymer which has not been cross-linked by the irradiation.

Preferably, the mixture for forming the covering of a cable-conductor according to this invention, includes a third component which serves the purpose of fluidizing said mixture, during its extrusion for forming the covering. When said third, fluidizing component is present, such component is a polymer which is cross-linkable by the irradiation which is used to cross-link the second component and may be ethylene-propylene-diene polymer (EPDM) or silicone rubbers. As a consequence, during the cross-linking, by irradiation, of the conductor covering, even the fluidizing component is cross-linked which contributes to the forming of the polymeric meshes which enmesh the base polymer. The fluidizing component may be present in an amount up to 50 parts by weight per 100 parts by weight of the base polymer and preferably, is present in 5 to 30 parts by weight per 100 parts by weight of the base polymer.

Two specific examples of mixtures of the conductor covering compound of the invention are as follows:

EXAMPLE 1

The conductor covering compound of this example contains only the fundamental components according to the invention. The recipe for this is as follows:

| | |
|---|---|
| a. AROMATIC POLYETHERIMIDE such as, for example, that sold by General Electric under the trade name ULTEM 1000 | 100 parts by weight |
| b. TRIMETHYLOL PROPANE TRIMETHACRYLATE | 15 parts by weight |
| c. ANTIOXIDIZER such as that sold by Monsanto under the trade name SANTONOX R | 1.5 parts by weight |

EXAMPLE 2

In addition to the essential components, the compound of this example also contains a further component for fluidizing the compound during its extrusion. The recipe for this is as follows:

| | |
|---|---|
| a. AROMATIC POLYETHERIMIDE such as, for example, that sold by General Electric under the trade name ULTEM 100 | 100 parts by weight |
| b. TRIMETHYLOL PROPANE TRIMETHACRYLATE | 10 parts by weight |
| c. EPDM | 5 parts by weight |
| d. ANTIOXIDIZER such as that sold by Monsanto under the trade name SANTONOX | 1 parts by weight |

With these said compounds two cables, according to the invention, have been made by extruding the compounds over a conductor in such a way as to form a covering for the latter and thereafter, subjecting the thus obtained cables, to an irradiation at 10 Megarads, by means of a known device, so as to cause the irradiation cross-linking of the cross-linkable component or components of the conductor covering formed by the compounds.

Specifically, two cables were manufactured, each cable having a conductor with a cross-section of 1 $mm^2$ and an irradiated covering with a thickness equal to 0.15 mm.

Experimental tests were carried out on these two cables—for ascertaining their heat-resistant and non fire-propagating properties and also for checking the extent of any toxic gases which may be generated by the burning of said coverings.

Similar experimental tests were also carried out on a prior art cable of the same category and having the same dimensions, the conductor covering of which was made of a radiation cross-linked compound based on an ethylene-tetrafluoroethylene copolymer. Said prior art cable is known to those skilled in the art as being one of the best known cables provided with a cross-linked conductor covering as far as fire-propagation resistance and heat-resistance are concerned.

The test for checking the resistance to fire-propagation was carried out according to the U.L. STANDARDS 44.

For this purpose, a length of cable was placed in a vertical position. Next, a flame was applied, for a period of 15 seconds, to the lower end of this cable length. After moving the flame away from the cable length, the period of time for the lighted conductor covering to extinguish by itself was noted, and the length of the conductor covering which actually suffered combustion was also measured.

The determination of the heat-resistance was effected by means of the two tests established by the MIL-W-22759D STANDARD.

The first of these two tests is the one that, in MIL-W-22759D is called "Dynamic Cut-Through Test", and it is carried out through the means of a special device provided for such test. The device in question includes a support upon which a length of cable is placed.

Above the cable, and placed transversally to it, there is disposed a blade connected to an arm with the latter being hinged at one extremity to the structure of the device, while at its other extremity, the arm is provided with means which are capable of applying a weight, the amount of which increased by 200 g. per minute.

The blade and the cable under test are inserted, in series, into an electrical circuit, and the whole is enclosed within a thermostatically regulated ambient set at a temperature established for a test, which, in this particular case, is 150° C.

After having inserted the cable into the above-described apparatus, the value of the weight applied to the arm which makes an incision in the conductor covering of a depth which will bring the blade into contact with the cable conductor itself is determined. The achievement of this situation is indicated by the flow of the current in the circuit wherein said elements are disposed in series.

The second test, for determining the heat-resistance characteristics, is the one which, in MIL-W-22759D is called "Life Cycle Test".

For this second test, a U-shaped length of cable is disposed around a mandrel having a diameter of 12 mm. and weights of 0.700 kg. are applied to the cable ends.

The just desoribed unit is then housed inside an air-circulating furnace having a temperature of 300° C., and it is left therein for 7 hours. After such period, a cooling takes place which, within an hour, reduces the temperature of the unit to 20° C.

After this operation the cable-length is wound completely over a 12 cm diameter mandrel, first in one sense and then in the opposite sense, while subjecting it to traction by weights of 0.700 kg. applied to the ends.

Successive to this treatment, the cable-length is immersed in a water solution containing 5% of a sodium-chloride solution, and after a 5 hour period of immersion, a voltage of 3 kV is applied between the extremities of the cable conductor and the solution, such voltage being applied to it for 5 minutes.

The test, for determining the toxicity of the gases which are generated during the combustion of the cable-covering, is carried out, by the means described hereinafter, for drawing up a "Halogen Index" which, in this test, signifies the quantity of the halogenated compounds formed expressed as a percentage by weight of hydrofluoric acid with respect to 100 g. of the irradiated material which forms the covering of the conductor.

The determination of this value is effectuated by means of burning a sample of 0.5 g. of the material forming the conductor covering of the cables according to the invention and of the covering of the above-mentioned "known", or prior art, cable and causing the gases thus obtained (for each) to bubble in a sodium hydroxide solution. The quantity of halogen ions which are present in the solution, is then determined by the methods set forth in the ASTM-D512 STANDARD.

On the basis of these values, the actual quantity of the said halogens present, can then be determined by means of calculations known to those skilled in the art, and the "Halogen Index" can also be determined.

The above-mentioned experimental tests were carried out on samples of the two cable lengths, according to the present invention, with their conductor covering formed with compounds cross-linked through irradiation (as given previously by way of example) and also on a sample of the prior art cable which is recognized as being one of the best examples of a cable as far as the heat-resistance of its conductor covering is concerned, the latter having a covering made from a compound based upon ethylene-polytetrafluoroethylene copolymer which is cross-linked through irradiation.

The results of these Experimental Tests are given in the following Table:

pared to those of the prior art cable, with respect to "Dynamic Cut Through" which means that as compared to the prior art cable, the thickness of the conductor-covering can be reduced as a consequence of the high values obtained from the "Dynamic Cut Through".

Furthermore, the test results of the tests for determining the toxicity of the gases that are generated during fires, show that with the known cables according to the present invention, as contrasted with the prior art cable, no danger is to be feared by reason of the formation of halogenated compounds during fires.

An explanation for the results obtained with cables according to the invention may be as described hereinafter.

With respect to heat resistance, the better performance of the cables according to the invention with respect to the known cables, could be due to the following reasons.

Even if the base polymers of the compounds, forming the covering of a cable according to the invention have softening temperatures of lower than 300° C., the fact that they are enclosed inside the tridimensional net formed by a polymer obtained through the radiation polymerization of a poly-functional monomer allows for the unit to possess a considerable dimensional stability at high temperatures. Probably, this is because the net is formed in the presence of the base polymer, and hence, it results that the net is closely connected to it.

Finally, the possibility of introducing substances having a high fluidizing action into the compounds forming the insulating covering of the cable conductor of the invention which are formed by polymers which are cross-linkable through irradiation, apart from the fact of aiding and speeding up the formation through extrusion of the conductor coverings, also contributes, along with the polymerizable monomers, in creating the cross-linked polymeric net which encases the base polymer of the compound.

| | EXAMPLE 1 irradiation treated covering | EXAMPLE 2 irradiation treated covering | Prior art irradiation treated ethylene-tetrafluoroethylene covering |
|---|---|---|---|
| FIRE-PROPAGATION according to the STANDARD-UL 44 | Self-Extinguishing Time: less than 5 seconds Length of cable tract burned: less than 20 cm | Self-Extinguishing Time: less than 5 seconds Length of cable tract burned: less than 20 cm | Self-Extinguishing Time: less than 5 seconds Length of cable tract burned: less than 20 cm |
| "DYNAMIC CUT-THROUGH TEST" according to the STANDARD-MIL-W22759D1 | 19 Kg. | 17 Kg. | 9 Kg. |
| "LIFE CYCLE TEST" according to the STANDARD-MIL-W22759D | RESISTS at 3 kV: for 5 minutes | RESISTS at 3 kV: for 5 minutes | RESISTS at 3KV: for 5 minutes |
| "HALOGEN INDEX in weight of hydrofluoric acid per 100 g. of compound | 0 | 0 | 45 |

From the results of the experimental tests set forth in the Table, it can be seen that with cables according to the present invention, the objects of the invention can be achieved.

In fact, whereas, with respect to the resistance to fire-propagation, the cables of this invention have the same characteristics as those of a prior art cable having a covering formed by an ethylene-tetrafluoroethylene copolymer, the characteristics of heat-resistance of the cables of the invention provide better results, as com- Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A low voltage electric cable having a conductor surrounded by at least one layer of irradiated insulation, said layer comprising a polymer which is not cross-linked and is substantially non-cross-linkable by irradiation enmeshed in a tri-dimensional mesh of monomer units polymerized and cross-linked with other monomer units by irradiation, said polymer being selected from the group consisting of polyarlylates, aromatic polyethersulphones, aromatic polysulphones, aromatic polysulphides, aromatic polyetherimides, aromatic polyimides, aromatic polyamides, aromatic polyimideamides and mixtures thereof and said monomer being selected from the group consisting of triallylcyanurate, triallylisocyanurate, trimethylpropane trimethacrylate, ethoxylated bis-phenol-A-trimethacrylate and mixtures thereof.

2. A low voltage electric cable as set forth in claim 1, wherein the monomer is present, prior to irradiation, in an amount from about 5 to about 100 parts by weight with respect to 100 parts by weight of the polymer.

3. A low voltage electric cable as set forth in claim 1, wherein the monomer is present, prior to irradiation, in an amount from about 10 to about 30 parts by weight with respect to 100 parts by weight of the polymer.

4. A low voltage electric cable having a conductor surrounded by at least one layer of insulation, said layer comprising a polymer which is not cross-linked and is substantially non-cross-linkable by irradiation enmeshed in a tri-dimensional mesh of a monomer cross-linked and polymerized by irradiation and a fluidizer which comprises a polymeric material cross-linkable by radiation, said polymer being selected from the group consisting of polyarylates, aromatic polyethersulphones, aromatic polysulphones, aromatic polysulphides, aromatic polyetherimides, aromatic polyimides, aromatic polyamides, aromatic polyimide-amides and mixtures thereof and said monomer being selected from the group consisting of triallycyanurate, triallylisocyanurate, trimethylolpropane trimethacrylate, ethoxylated bis-phenol-A-trimethacrylate and mixtures thereof.

5. A low voltage electric cable as set forth in claim 4, wherein said polymeric material is selected from the group consisting of ethylene-propylene-diene polymer, silicone rubber and mixtures thereof.

* * * * *